United States Patent [19]
Matsumura

[11] Patent Number: 5,241,775
[45] Date of Patent: Sep. 7, 1993

[54] METHOD OF ATTACHING LEADER TO FISHHOOK AND FISHHOOK HAVING LEADER ATTACHED THERETO

[75] Inventor: Tsuyoshi Matsumura, Higashi-Osaka, Japan

[73] Assignee: Kabushiki Kaisha Hakutaka Kogyo, Higashi-Osaka, Japan

[21] Appl. No.: 778,053

[22] PCT Filed: Apr. 25, 1991

[86] PCT No.: PCT/JP91/00568
§ 371 Date: Jan. 10, 1992
§ 102(e) Date: Jan. 10, 1992

[87] PCT Pub. No.: WO91/16816
PCT Pub. Date: Nov. 14, 1991

[30] Foreign Application Priority Data
May 2, 1990 [JP] Japan .................. 2-116339

[51] Int. Cl.⁵ .............................. A01K 91/04
[52] U.S. Cl. .................. 43/44.83; 43/43.16; 24/265 EE
[58] Field of Search ............. 43/44.83, 43.16; 24/265 EG, 115 N

[56] References Cited

U.S. PATENT DOCUMENTS

| | | | |
|---|---|---|---|
| 831,211 | 9/1906 | Buckingham, Jr. | 43/44.83 |
| 1,093,000 | 4/1914 | Kinsey | 43/44.83 |
| 2,333,503 | 11/1943 | Worden | 43/44.83 |
| 2,792,664 | 5/1957 | Schwarzer | 43/44.83 |
| 3,218,753 | 11/1965 | Wylie | 43/44.83 |
| 4,621,449 | 11/1986 | Nakagawa | 43/44.83 |

FOREIGN PATENT DOCUMENTS

| | | | |
|---|---|---|---|
| 1437660 | 3/1966 | France | 43/44.83 |
| 59-119160 | 8/1964 | Japan . | |
| 61-158166 | 10/1986 | Japan . | |
| 62-001570 | 1/1987 | Japan . | |
| 63-148171 | 9/1988 | Japan . | |
| 1-043015 | 12/1989 | Japan . | |

Primary Examiner—Mark Rosenbaum
Assistant Examiner—Chuck Y. Mah

[57] ABSTRACT

A method of attaching a leader to a fishhook includes the steps of positioning the leader (2) in contact with an end of the shank (4) of the fishhook (1) along the shank (4), winding a metallic wire (3) around the shank (4) and the leader (3) in the form of a coil, causing the metallic wire (3) to retain the wound state, and applying an adhesive (6) to the coil portion (5) of the metallic wire (3) to cover the coil portion (5). A fishhook with the leader is thus formed.

19 Claims, 3 Drawing Sheets

METHOD OF ATTACHING LEADER TO FISHHOOK AND FISHHOOK HAVING LEADER ATTACHED THERETO

TECHNICAL FIELD

The present invention relates to a method of attaching a leader to a fishhook, and fishhooks having a leader attached thereto for use in fishing.

BACKGROUND ART

The method of attaching a leader to a fishhook differs with the shape of the so-called eye at the shank end of the fishhook, so that various attaching methods are conventionally available.

These methods include, for example, a method of firmly attaching a leader to a fishhook by placing the leader close to the shank end of the fishhook along the shank, and winding a thin thread around the leader and the shank. In this method, the wound thin thread is thereafter treated, for example, by manually tying the leading end and the terminal end of the thread together, or by covering the winding of the thread directly with adhesive or synthetic resin.

With the prior art described, however, the leading and terminal thread ends must be tied together invariably by a manual procedure as mentioned above, so that this has been an obstacle to the automation of the manufacturing process. Furthermore, fishhooks of smaller size require a great skill for the thread tying procedure.

On the other hand, the procedure for covering the thread winding with adhesive or the like is suited to the automation of the manufacturing process since the thread need not be tied manually. In this case, however, it is likely that the thread winding will loosen while the applied adhesive solidifies from the state of a gel. This results in the drawback of impairing the joint strength between the leader and the fishhook.

DISCLOSURE OF THE INVENTION

An object of the present invention is to provide a method of attaching a leader to a fishhook by attaching the leader to the shank of the fishhook extremely easily and yet firmly and with good stability, and fishhooks having a leader thus attached thereto.

To fulfill the above object, a metallic wire is wound around the shank of a fishhook and a leader in the form of a coil according to the present invention.

More specifically, the method of the present invention is characterized in that a leader is attached to a fishhook by positioning a leader in contact with an end of the shank of the fishhook along the shank, winding a metallic wire around the shank and the leader in the form of a coil, causing the metallic wire to retain the wound state, and applying an adhesive to the coil portion of the metallic wire to cover the coil portion.

The fishhook having a leader attached thereto leader is positioned in contact with an end of the shank of the fishhook along the shank, a metallic wire being wound around the combination of the shank and the leader in the form of a coil and retaining the wound state, the coil portion of the metallic wire being covered with an adhesive.

With the fishhook having a leader attached thereto by the method of the present invention and embodying the invention, the leader is positioned in contact with the shank end of the fishhook along the shank, and a metallic wire is continuously wound around the combination of the shank and the leader.

After the metallic wire has been wound over a suitable distance along the shank axis, an adhesive is applied to the resulting coil portion of the metallic wire to cover the coil portion. The metallic wire is thereafter cut off at opposite ends of the coil portion.

The metallic wire has plasticity sufficient to retain the wound state when wound around the leader and the shank. For example, mild steel has such nature.

According to the present invention, therefore, it is almost unlikely that the wire coil will loosen before the adhesive dries and solidifies unlike the conventional thread winding. Moreover, the wound metallic wire, which has plasticity as stated above, exhibits a stabilized fastening force over the entire area of the coil portion, that is, every turn of the winding exhibits such a force.

Thus according to the present invention, the wound metallic wire is almost unlikely to loosen over the coil portion before the adhesive solidifies on drying, so that the coil portion can be enclosed with the adhesive while retaining the fastening force without impairment. Consequently, the leader can be attached to the fishhook firmly by a simple procedure with high stability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BEST MODE OF CARRYING OUT THE INVENTION

Embodiments of the present invention will be described below with reference to the drawings.

Figure 1:
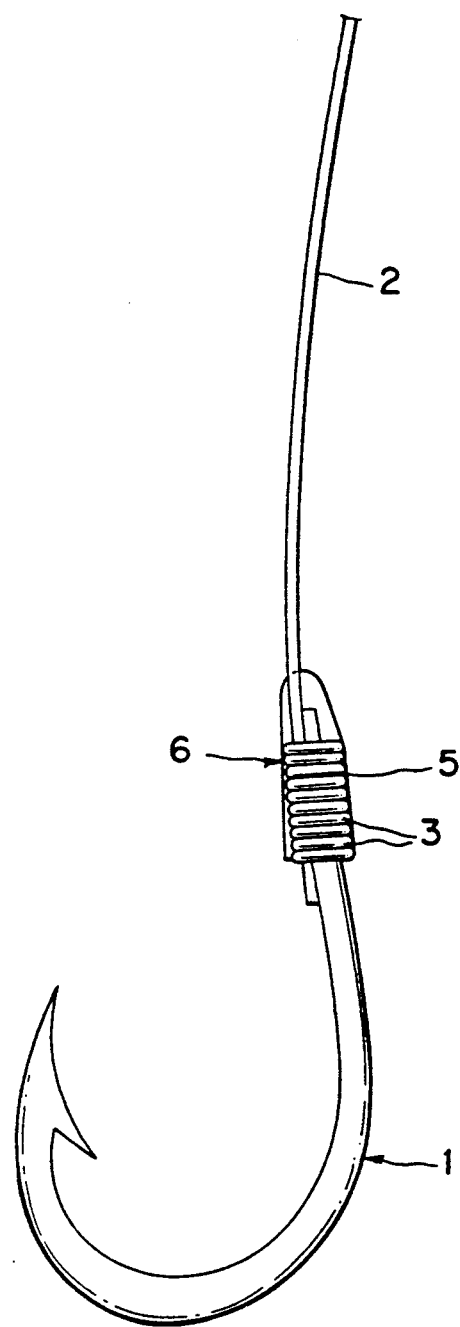
FIG. 1 is a side elevation of an embodiment of the invention, i.e., a fishhook having a leader attached thereto.

In the drawings, indicated at 1 is a fishhook, at 2 a fishline (leader) of nylon or the like, and at 3 a metallic wire. As shown in FIG. 1, the leader 2 is attached at its leading end to the end of shank 4 of the fishhook 1. Attachment of the leader 2 to the shank 4 will be described below.

Figure 2:
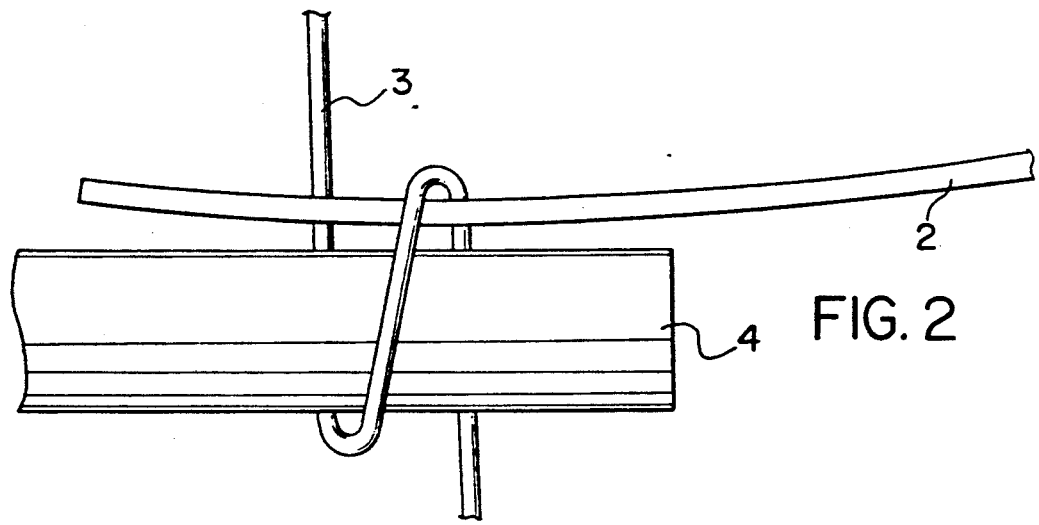
FIG. 2 to FIG. 4 are views showing stepwise assembly of a first embodiment of the invention.

First as seen in FIG. 2, the leader 2 is positioned close to the inner side of the shank 4 so as to extend along the shank 4. (The curving-in side of the fishhook 1 is referred to as the "inner side," and the opposite side thereof as the "outer side.") The metallic wire 3 is wound around the combination of the shank 4 and the leader 2 in the form of a coil. The metallic wire 3 to be used in the present embodiment is one having plasticity sufficient to retain its wound state when wound around the leader 2 and shank 4, for example, a wire of mild steel.

Figure 3:
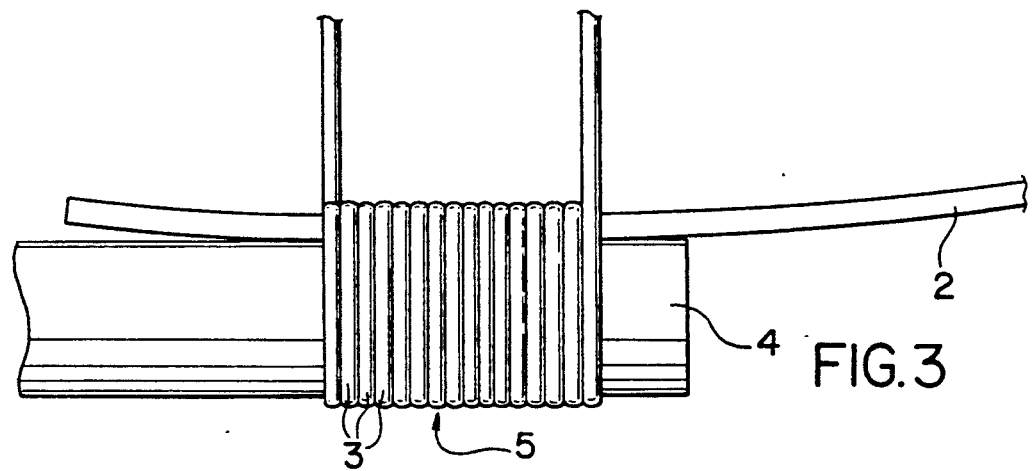
Figure 4:
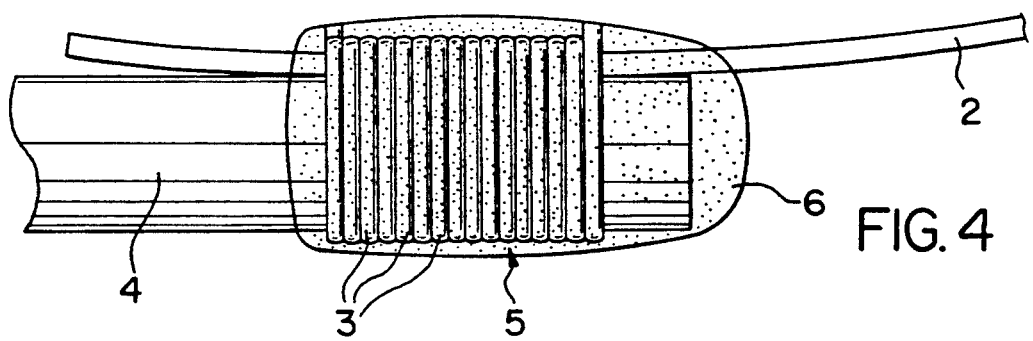

Next with reference to FIGS. 3 and 4, when a coil portion 5 has been formed by winding the metallic wire 3 over a predetermined length along the axis of the shank, an adhesive 6 is applied to the entire periphery of the coil portion 5 to enclose the coil portion 6 with the adhesive.

Finally, the metallic wire 3 is cut off at opposite ends of the coil portion. The adhesive 6 is thereafter allowed to stand for drying and solidification, whereby the leader 2 is completely attached to the fishhook 1.

With the present embodiment wherein the leader 2 is attached to the fishhook 1 in this way, the metallic wire 3 retains the wound state around the shank 4 and the leader 2, so that the coil portion 5 of the wound wire is unlikely to loosen before the adhesive 6 dries and solidifies. Consequently, the coil portion exhibits a great fastening force with high stability unlike the conventional thread winding. This almost completely eliminates the likelihood of producing rejects.

Furthermore, the wound metallic wire 3 is thereafter treated only by cutting off the wire 3 and applying the adhesive 6 without necessitating the prior art procedure of thread tying. This assures a greatly simplified attaching procedure and also makes it possible to automate the entire process including the metallic wire winding procedure.

Figure 5:
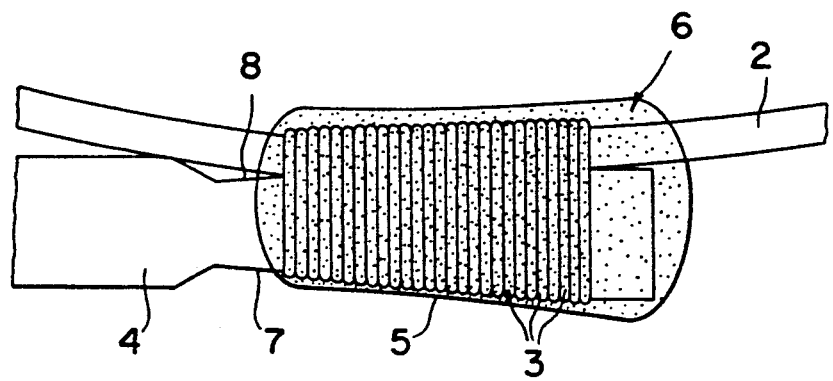
FIG. 5 is an enlarged side elevation showing a second embodiment of the invention, i.e., a fishhook having a leader attached thereto.

FIG. 5 shows a second embodiment of the present invention. With reference to this drawing, indicated at 7 and 8 are slanting faces formed on the inner and outer sides of the shank 4. The slanting faces 7, 8 are formed by cutting or forging the shank 4 at the portion thereof where the coil portion 5 is to be provided. The slanting faces 7, 8 are so formed as to incline radially of the shank 4 as they extend toward the shank end axially thereof. With the present embodiment, the leader 2 is positioned in contact with the slanting face 7, and the metallic wire 3 is wound around the shank 4 formed with the slanting face 7 and the leader 2, whereby the leader is attached to the shank as in the first embodiment.

Figure 6:
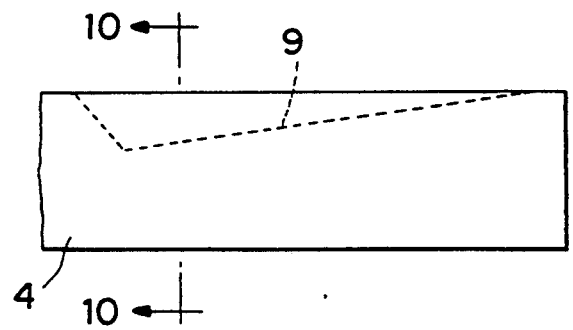
FIG. 6 is a side elevation of the shank of a fishhook showing a third embodiment of the invention.
Figure 7:
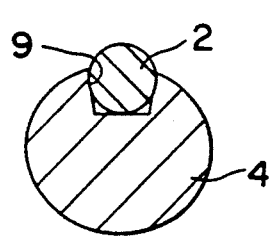
FIG. 7 and FIG. 8 are views in section taken along the line 10—10 in FIG. 6.
Figure 8:
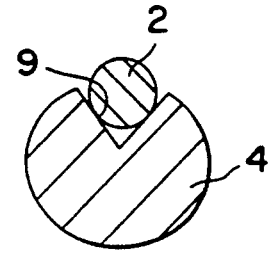

Next, FIGS. 6 to 8 show a third embodiment of the invention. Indicated at 9 in these drawings is an accommodating groove 9 which is formed in the end of the shank 4 on the inner side thereof in parallel to the axis of the shank 4. With the present embodiment, the leader 2 is accommodated in the groove 9 as seen in FIGS. 7 and 8 and is thereafter attached to the shank in the same manner as in the first embodiment.

Like the slanting faces 7, 8 described, the bottom face of the accommodating groove 9 is so formed as to incline radially of the shank 4 as it extends toward the end of the shank 4 axially thereof. While the accommodating groove 9 is so shaped as shown in FIG. 7 or FIG. 8 in cross section, the groove may be otherwise shaped as desired insofar as the leader 2 can be retained therein.

Although the metallic wire 3 is cut off after the application of the adhesive 6 according to the foregoing embodiments, the wire 3 may be cut off conversely before the application of the adhesive 6 provided that the metallic wire 3 can be retained in the wound state satisfactorily.

Further the present invention is not limited to the above embodiments.

The present invention can be used in the fishing tackle manufacturing industry.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of attaching a leader to a fishhook having a shank comprising the steps of:

positioning the leader in contact with an indentation in an end of the shank of the fishhook, the end of the shank of the fishhook having a generally uniform diameter, the shank having generally a constant diameter except for a diameter along the indentation, the indentation extending longitudinally along the shank and having a first end and a second end, the first end of the indentation being positioned closer to the end of the shank than the second end thereof, the second end of the indentation being deeper in the shank than the first end of the indentation;

winding a metallic wire around the shank and the leader to form a coil portion, the metallic wire being wound in only one direction around the leader and shank and forming only one layer over the leader and shank without any tying of the metallic wire;

causing the metallic wire to retain a wound shape in the coil portion, the metallic wire having a first end and a second end in the coil portion, the first and second ends of the metallic wire being located at opposite ends of the coil portion; and applying an adhesive to the coil portion of the metallic wire to cover the coil portion, the metallic wire and adhesive holding the leader to the shank of the fishhook.

2. The method of attaching a leader to a fishhook as defined in claim 1, further comprising the step of using a wire made of mild steel as the metallic wire.

3. The method of attaching a leader to a fishhook as defined in claim 1, further comprising the step of using a leader made of nylon as the leader which is positioned in contact with the shank of the fishhook.

4. The method of attaching a leader to a fishhook as defined in claim 1, further comprising the step of using a single line as the leader, the single line having only one end positioned proximate to the coil portion.

5. The method of attaching a leader to a fishhook as defined in claim 1, wherein the indentation is a slanting face formed on the shank and the slanting face is inclined radially of the shank as the face extends toward the end of the shank axially thereof, the metallic wire being positioned along the slanting face during the step of winding.

6. The method of attaching a leader to a fishhook as defined in claim 1, wherein the indentation is an accommodating groove formed along the shank, the metallic wire being positioned along the accommodating groove during the step of winding.

7. The method of attaching a leader to a fishhook as defined in claim 6, wherein the accommodating groove has a v-shape in cross section, two walls being provided in the accommodating groove, the two walls meeting at the bottom of the accommodating groove, the step of positioning the metallic wire includes placing the wire against the two sides of the accommodating groove.

8. The method of attaching a leader to a fishhook as defined in claim 6, wherein the accommodating groove has generally a u-shape in cross section with two walls and a bottom being provided in the accommodating groove, the step of positioning the metallic wire includes placing the metallic wire against the two sides and the bottom of the accommodating groove.

9. The method of attaching a leader to a fishhook as defined in claim 1, further comprising the step of cutting the metallic wire after the step of applying the adhesive and a step of solidifying the adhesive after the step of cutting.

10. A fishhook having a leader attached thereto comprising an indentation provided in a shank of the fishhook, a metallic wire and an adhesive, the shank being located at one end of the fishhook, the end of the fishhook with the shank having a generally uniform diameter, the shank having a generally constant diameter except for a diameter along the indentation, the indentation extending longitudinally along the shank and having a first end and a second end, the first end of the indentation being positioned closer to the end of the fishhook than the second end thereof, the second end of the indentation being deeper in the shank than the first end of the indentation, the leader being in the indentation in the shank, the metallic wire being wound around the leader in the indentation, the metallic wire being wound in only one direction and in only one layer over the leader and shank to form a coil portion, the metallic wire having a first end and a second end in the coil portion, the first and second ends of the metallic wire being located at opposite ends of the coil portion without any tying of the metallic wire, the adhesive covering the metallic wire and leader at the coil portion, the metallic wire and adhesive retaining the leader on the shank of the fishhook.

11. The fishhook having a leader attached thereto as defined in claim 10, wherein the metallic wire is made of mild steel.

12. The fishhook having a leader attached thereto as defined in claim 10, wherein the leader is made of nylon.

13. The fishhook having a leader attached thereto as defined in claim 10, wherein the leader is a single line, the single line having only one end positioned proximate to the coil portion.

14. The fishhook having a leader attached thereto as defined in claim 10, wherein the indentation is a slanting face formed on the shank and the slanting face is inclined radially of the shank as the face extends toward the end of the shank axially thereof, the metallic wire being positioned along the slanting face.

15. The fishhook having a leader attached thereto as defined in claim 10, wherein the indentation is an accommodating groove formed along the shank, the metallic wire being positioned along the accommodating groove.

16. The fishhook having a leader attached thereto as defined in claim 15, wherein the accommodating groove has a v-shape in cross section, two walls being provided in the accommodating groove, the two walls meeting at the bottom of the accommodating groove, the metallic wire abutting the two sides of the accommodating groove.

17. The fishhook having a leader attached thereto as defined in claim 15, wherein the accommodating groove has generally a u-shape in cross section with two walls and a bottom being provided in the accommodating groove, the metallic wire abutting the two sides and the bottom of the accommodating groove.

18. The fishhook having a leader attached thereto as defined in claim 10, wherein the metallic wire is cut after the adhesive is applied on the coil portion to form two wire ends, the two wire ends being located proxmiate to the adhesive.

19. The fishhook having a leader attached thereto as defined in claim 10, wherein the metallic wire is generally uniformly wound around the leader and shank in the coil portion, the shank having a center with distances from the center of the shank to the metallic wire in the coil portion being generally uniform around a circumference of the shank except at the leader.

* * * * *